H. Schussler.
Chain-Inclinometer.
Nº 73391.  Patented Jan. 14, 1868.
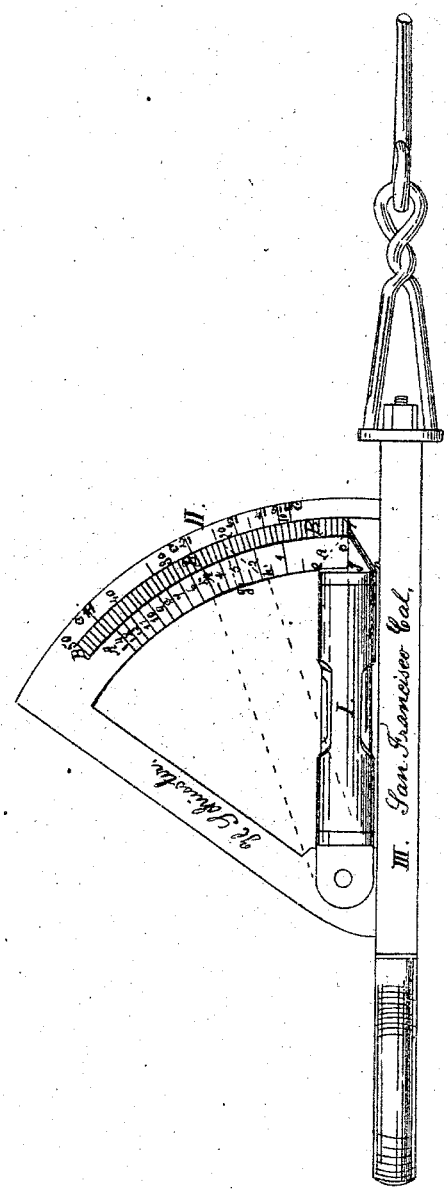
Witnesses
Geo. H. Strong
J. L. Boone
Inventor:
Hermann Schussler

United States Patent Office.

HERMANN SCHÜSSLER, OF SAN FRANCISCO, CALIFORNIA.

Letters Patent No. 73,391, dated January 14, 1868.

IMPROVEMENT IN CHAIN-INCLINOMETERS.

The Schedule referred to in these Letters Patent and making part of the same.

TO ALL WHOM IT MAY CONCERN:

Be it known that I, HERMANN SCHÜSSLER, of San Francisco, county of San Francisco, State of California, have invented an Inclinometer for Surveyors' Chains; and I do hereby declare the following description and accompanying drawings are sufficient to enable any person skilled in the art or science to which it most nearly appertains to make and use my said invention without further invention or experiment.

The nature of my invention is to provide a chain-inclinometer, to indicate the amount of correction to be made on each chain's length, which can be employed for all civil engineering purposes, by being attached to a surveyor's chain, and consists of three parts, to wit, the level, moving about a central point, which point forms the centre of all the arcs of the scale, and, as the two sides of the glass are ground parallel, it can be used, if reversed, in chaining down a hill. The inclinometer can be detached from the chain, when it may be used in setting the slope of railroad-embankments, dams, ditches, &c.

To more fully illustrate and describe my invention, reference is had to the accompanying drawings and the letters marked thereon.

Referring to the drawings, the scale A A indicates the number of units to be added to any chain of fifty (50) parts, or one half the number of units for any chain of one hundred (100) parts, for any incline over which the measurement is made. For instance, the two chainmen ascend a hill, the first one carrying the inclinometer, and after the chain is stretched parallel with or on the slope, and while pulling the chain by the handle III, with his left hand, he may move the level II into its horizontal position with his right hand, and read off the number on the scale A A A, which is indicated by the face $gf$ of the hand $gfh$. Supposing the position of the level so acquired was as indicated by the red lines in the diagram, the hand being now in the position $gfh$, would read $3\frac{1}{2}$, which means that a pin has to be placed $3\frac{1}{2}$ units ahead of the end of the chain. At the same time, we find $gf$ to indicate the number of degrees between the inclination and the horizontal. The opposite side of the arc II is also provided with the scales A A A and B B B, and the level I is reversible, which admits of the employment of the inclinometer for measuring down hill, as well as for setting slope-stakes for railroads, embankments, dams, ditches, &c., as the scale C C C indicates the inclination of slope, from 6:1 up to 1:1. In this case the swivel is to be detached from the inclinometer by the screw $i$.

By the use of my inclinometer, the difficulties of chaining on steep slopes will be, in a great measure, avoided. The whole length of the chain will be available, as there will now be no necessity of levelling the chain, the inclinometer correcting all the measurements, as described, and with absolute correctness.

Having thus described my invention, what I claim, and desire to secure by Letters Patent, is—

A chain-inclinometer, having the level I and the scale A A, together with the handle III, for ascertaining the correct horizontal distance when measuring the whole, constructed and operated substantially as and for the purpose herein described.

In witness whereof, I have hereunto set my hand and seal.

H. SCHÜSSLER. [L. S.]

Witnesses:
J. L. BOONE,
GEO. H. STRONG.